(12) United States Patent
Hatch et al.

(10) Patent No.: US 10,781,806 B2
(45) Date of Patent: Sep. 22, 2020

(54) COMPRESSOR VALVE SEAT RECONDITIONING LIMIT INDICATOR

(71) Applicants: Glenn D. Hatch, Corning, NY (US); Joel T. Sanford, Bath, NY (US); Jeffrey Pennypacker, Corning, NY (US)

(72) Inventors: Glenn D. Hatch, Corning, NY (US); Joel T. Sanford, Bath, NY (US); Jeffrey Pennypacker, Corning, NY (US)

(73) Assignee: DRESSER-RAND COMPANY, Olean, NY (US)

( * ) Notice: Subject to any disclaimer, the term of this patent is extended or adjusted under 35 U.S.C. 154(b) by 224 days.

(21) Appl. No.: 14/272,650

(22) Filed: May 8, 2014

(65) Prior Publication Data
US 2014/0339453 A1    Nov. 20, 2014

Related U.S. Application Data

(60) Provisional application No. 61/823,008, filed on May 14, 2013.

(51) Int. Cl.
*F16K 37/00* (2006.01)
*F04B 39/10* (2006.01)
*F16K 15/02* (2006.01)
*F16K 1/42* (2006.01)

(52) U.S. Cl.
CPC ...... *F04B 39/1053* (2013.01); *F04B 39/1013* (2013.01); *F16K 1/42* (2013.01); *F16K 15/026* (2013.01); *F16K 37/0008* (2013.01); *Y10T 137/0486* (2015.04)

(58) Field of Classification Search
CPC .............. F04B 39/1053; F04B 39/1066; F04B 39/1013; Y10T 137/0486; Y10T 29/49302; Y10T 29/49306; Y10T 29/49995; F16K 37/0008; F16K 37/0016; F16K 1/42;
(Continued)

(56) References Cited

U.S. PATENT DOCUMENTS 2,624,587 A * 1/1953 Watson ................. F16K 15/063
137/454.4
3,148,697 A * 9/1964 Carr ..................... F04B 39/1006
137/327
(Continued)

FOREIGN PATENT DOCUMENTS

CN          202833042 U      3/2013

*Primary Examiner* — Craig J Price
*Assistant Examiner* — Andrew J Rost (57) ABSTRACT

A compressor valve may include a guard and a seat affixed thereto. The seat may have an inlet surface and an outlet surface opposite the inlet surface. A reconditioning limit indicator may be defined by or adjacent the outlet surface. The reconditioning limit indicator may be indicative of a maximum amount of material of the seat removable from the outlet surface during reconditioning of the seat. The reconditioning limit indicator may be a groove defined by the outer cylindrical surface of the seat, a portion of the outer cylindrical surface of the seat adjacent the outlet surface and having an outer diameter smaller than the outer diameter of the seat, or a predetermined shape of a predetermined depth machined on the outlet surface of the seat.

1 Claim, 5 Drawing Sheets

(58) Field of Classification Search
CPC .............. F16K 15/026; B23C 2210/66; B23C 2255/04; B23P 6/02; B23P 13/00; F16D 66/02
USPC .......... 137/559, 15.17, 516.21; 92/158, 159; 251/366, 359; 29/402.06, 402.02, 402.04, 29/890.12, 890.122, 890.128, 402.11
See application file for complete search history.

(56) References Cited

U.S. PATENT DOCUMENTS

| | | | | |
|---|---|---|---|---|
| 3,536,094 | A * | 10/1970 | Manley, Jr. | F04B 39/1033 137/512.1 |
| 4,018,247 | A * | 4/1977 | Carr | F16K 15/042 137/512.1 |
| 4,483,363 | A * | 11/1984 | Madoche | F04B 39/1033 137/329.04 |
| 4,489,752 | A * | 12/1984 | Deminski | F16K 15/025 137/512.1 |
| 4,872,481 | A * | 10/1989 | Shaw | F16K 1/42 137/512.1 |
| 5,052,434 | A * | 10/1991 | Bauer | F04B 39/1033 137/512.1 |
| 5,139,114 | A * | 8/1992 | Rodriguez | F16D 66/02 188/1.11 W |
| 5,511,583 | A * | 4/1996 | Bassett | F04B 39/1033 137/512.1 |
| 5,669,411 | A | 9/1997 | LeGros et al. | |
| 6,308,803 | B1 * | 10/2001 | Oberti | F16D 65/127 188/1.11 W |
| 6,581,632 | B2 * | 6/2003 | Walpole | F04B 39/1053 137/512.1 |
| 2008/0149194 | A1 * | 6/2008 | Spiegl | F04B 39/1033 137/516.21 |

* cited by examiner

COMPRESSOR VALVE SEAT RECONDITIONING LIMIT INDICATOR

CROSS-REFERENCE TO RELATED APPLICATIONS

This application claims priority to U.S. Provisional Patent Applications having Ser. No. 61/823,008, which was filed May 14, 2013. This priority application is hereby incorporated by reference in its entirety into the present application to the extent consistent with the present application.

BACKGROUND

Generally, a compressor valve may include a guard (also referred to as a stopplate) retaining a plurality of valve elements, and a seat disposed on the guard. The seat may define an array of inlet holes for working fluid to enter the compressor valve via the inlet holes and the guard may define an array of outlet holes disposed between the plurality of valve elements for the working fluid to exit the compressor valve. The plurality of valve elements may control the flow of working fluid into the compressor valve. Generally, when the valve elements seal the inlet holes, the working fluid is prevented from exiting the inlet holes (thereby from entering the valve) and when the valve elements unseal inlet holes, the working fluid enters the compressor valve and exits via the outlet holes on the guard.

Due to repeated sealing and unsealing of the inlet holes by the valve elements, the edges of the inlet holes may deform in shape (e.g., develop crack, dents, or the like) and working fluid may enter the compressor valve when the valve element is in contact with the edge of the inlet hole. Typically, to restore the seal between the valve elements and the inlet holes, the seat is reconditioned by removing material from the surface of the seat facing the guard.

However, for correct operation of the compressor valve, a minimum seat thickness has to be maintained after reconditioning the seat. Failing to maintain a minimum seat thickness may result in improper operation and/or failure of the compressor valve. Accordingly, a known industry practice is for manufacturers of such compressor valves to provide the minimum seat thickness to the end-user via the compressor valve operation manual or as a separate sheet of paper detailing the reconditioning procedure. When reconditioning is required, the end-user refers to the provided documentation to ensure that the seat is not reconditioned to a thickness less than the minimum allowable. In a typical refinery including multiple compressors and each compressor including multiple compressor valves having different minimum seat thickness requirements, it may be difficult to keep track of the minimum seat thickness requirements of every compressor valve. Also, as the documentation cannot be kept with the compressor valve itself, it may often get lost or may be difficult to locate. This may lead to time wasted in locating the document, or the end-user may recondition the seat without knowledge of the minimum allowable thickness.

What is needed, then, is a facile manner of determining the minimum seat thickness of a compressor valve during a reconditioning operation without having to refer to an external document or device.

SUMMARY

Example embodiments of the disclosure may provide a compressor valve. The compressor valve may include a seat having an inlet surface and an outlet surface opposite the inlet surface. The seat may have a reconditioning limit indicator defined by or adjacent the outlet surface. The reconditioning limit indicator may be indicative of a maximum amount of material of the seat that may be removed from the outlet surface during reconditioning of the seat.

Example embodiments of the disclosure may provide a method of reconditioning a seat of a compressor valve. The method may include separating the seat from a guard of the compressor valve, removing material of the seat from an outlet surface of the seat, and referencing a reconditioning limit indicator defined by or adjacent the outlet surface. The removal of the material from the seat may be based at least in part on the reconditioning limit indicator. The reconditioning limit indicator may indicate a maximum amount of the material of the seat that may be removed from the outlet surface during reconditioning of the seat.

Example embodiments of the disclosure may provide another compressor valve. The compressor valve may include a cylindrical seat having an inlet surface and an outlet surface axially separated from the inlet surface. The cylindrical seat may define a plurality of inlet holes extending between the inlet surface and the outlet surface. The plurality of inlet holes may be coupled to respective openings defined by the outlet surface. The outlet surface may be beveled about each opening and may define a predetermined outer diameter for each opening. The cylindrical seat may have a reconditioning limit indicator defined by or adjacent the outlet surface. The reconditioning limit indicator may indicate a maximum amount of material of the seat that may be removed from the outlet surface such that the outlet surface about each opening may be re-beveled to have the predetermined outer diameter.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Further, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Figure 1A:
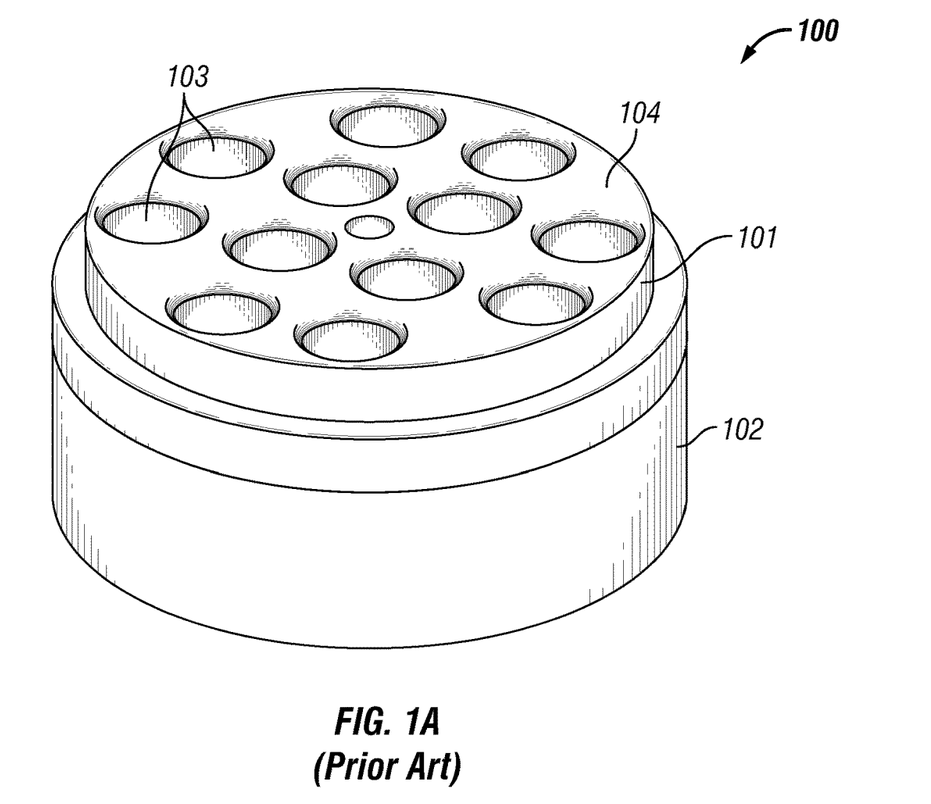
FIG. 1A illustrates a perspective view of an inlet surface of a seat of a conventional compressor valve.

FIG. 1A illustrates a perspective view of an inlet surface 104 of a seat 101 of a conventional compressor valve 100. The seat 101 and a guard 102 are affixed to each other by any suitable means. Working fluid enters the compressor valve 100 via an array of inlet holes 103 defined by the seat 101. The inlet holes 103 extend between an inlet surface 104 and an outlet surface 105 (FIG. 1B) of the seat 101. The guard 102 may be attached to the outlet surface 105 of the seat 101 and a plurality of valve elements (not shown) retained by the guard 102 may contact against the edges 108 of the inlet holes 103 on the outlet surface 105. When the valve elements contact against the edges 108 of the inlet holes 103, the inlet holes 103 may be sealed and working fluid may be prevented from exiting the inlet holes 103. It should be noted that, although the seat and guard in the present disclosure have been illustrated as generally cylindrical structures with the seat, for example, having different outer diameters, this is a mere design choice and that the structure of the seat and guard may be varied to fit any number of applications without departing from the scope of the disclosure.

Figure 1B:
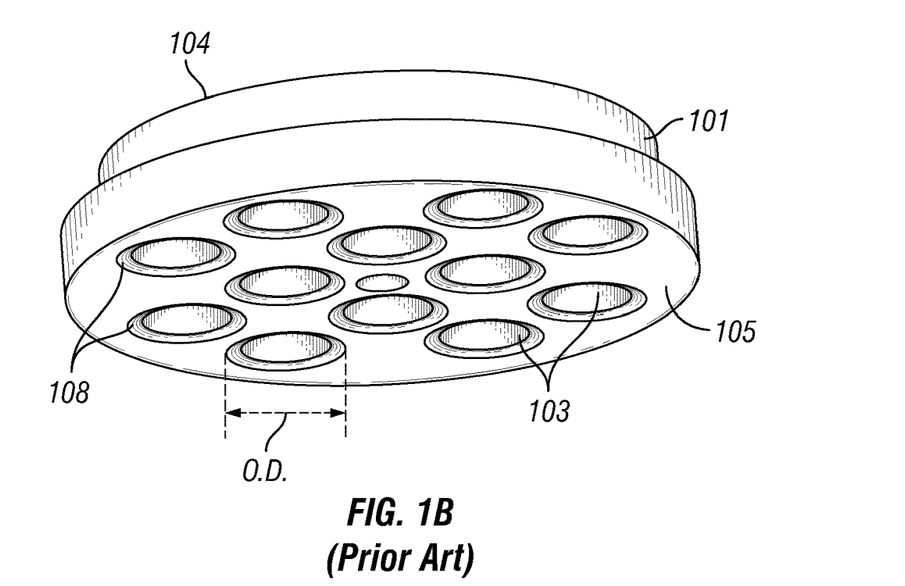
FIG. 1B illustrates a perspective view of an outlet surface of the seat of the conventional compressor valve of FIG. 1A in greater detail.

FIG. 1B illustrates the outlet surface 105 of the seat 101 of the conventional compressor valve 100 of FIG. 1A in greater detail. As illustrated, the edges 108 of the openings of the inlet holes 103 on the outlet surface 105 are beveled. In an example embodiment, an outer diameter (O.D.) of the respective beveled openings of the inlet holes 103 on the outlet surface 105 may be between 1.765 and 1.791 centimeters. However, it should be appreciated that these values are only an example and that the outer diameter may be different for different compressor valves. The surfaces of the valve elements that contact the edges 108 of the inlet holes 103 may be correspondingly beveled so as to create the seal between the valve elements and the inlet holes 103 to prevent the working fluid from exiting the inlet holes 103.

As mentioned above, due to the valve elements contacting the edges 108 of the inlet holes 103, the edges 108 of the inlet holes 103 may deform (e.g., the bevels at the edges of the inlet holes 103 may lose shape) and the seal between the valve elements and the inlet holes 103 may deteriorate. As a result, working fluid may exit the inlet hole 103 when the valve element is in contact with the edge 108 of the inlet hole 103. To restore the seal between the valve elements and the inlet holes 103, the seat 101 may be reconditioned by removing material from the outlet surface 105. For example, when reconditioning the seat 101, material from the outlet surface 105 may be removed in order to resurface the outlet surface 105 and the edges 108 of the inlet holes 103 may be re-beveled such that the outer diameter (O.D.) of the bevels may be restored to between, for example, 1.765 and 1.791 centimeters. However, it should be appreciated that the inlet holes 103 may be re-beveled to other dimensions based on the corresponding compressor valve specifications. The aforementioned O.D. of the bevels may be desired for a normal operation of the compressor valve 100 including the seat 101. It should be noted that only material from the outlet surface 105 may be removed when reconditioning the seat 101.

As is understood, reconditioning the seat may reduce an axial extent of the seat 101 measured from the inlet surface 104 to the outlet surface 105 (referred to as the thickness of the seat). According to example embodiments, in order to ensure that a minimum seat thickness is maintained when the seat is reconditioned, a reconditioning limit indicator (described below) may be provided on or adjacent the outlet surface 105.

Figure 2A:
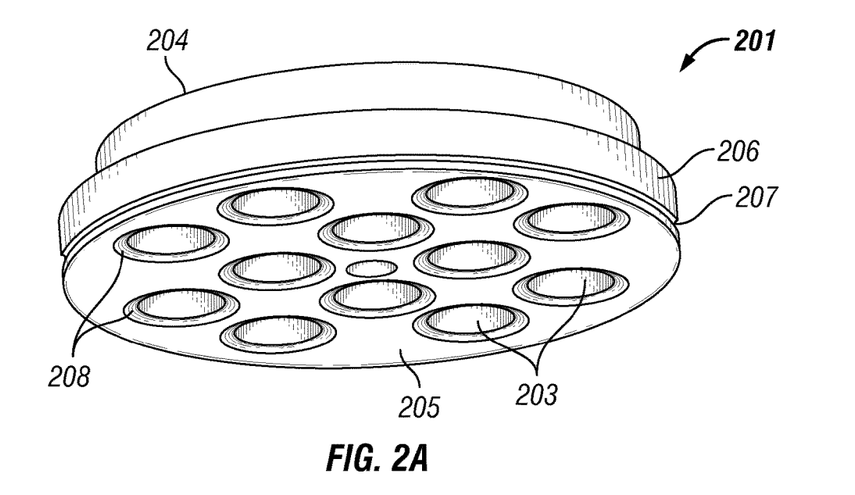
FIG. 2A illustrates a perspective view of a seat having a reconditioning limit indicator, according to an example embodiment of the disclosure.
Figure 2B:
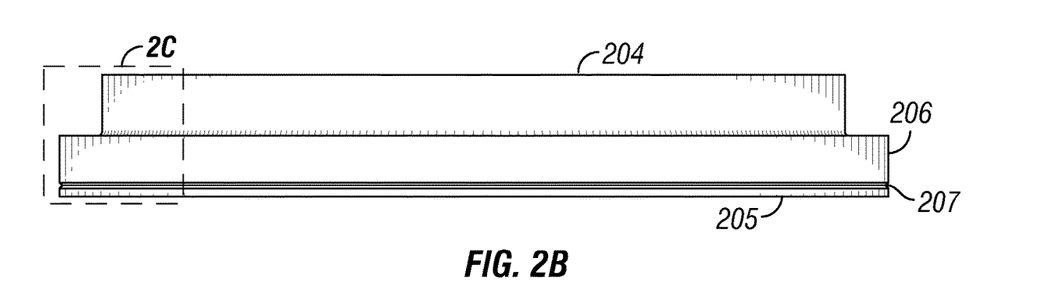
FIG. 2B illustrates a side view of the seat in FIG. 2A.
Figure 2C:
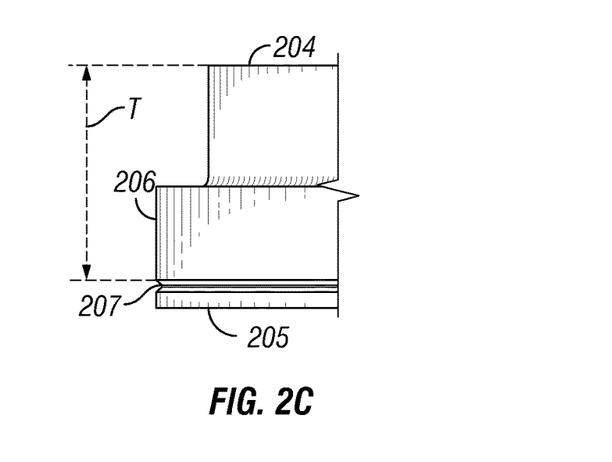
FIG. 2C illustrates an enlarged view of a portion of the seat in FIG. 2B enclosed by the dashed lines.

FIG. 2A illustrates a perspective view of a seat 201 having a reconditioning limit indicator 207, according to an example embodiment of the disclosure. FIG. 2B illustrates a side view of the seat 201 in FIG. 2A. FIG. 2C illustrates an enlarged view of a portion of the seat 201 in FIG. 2B enclosed by the dashed lines. As illustrated in FIGS. 2A-2C, the reconditioning limit indicator 207 may be a groove defined by the outer cylindrical surface 206 of the seat 201. The groove (e.g., a V-shaped groove) may be circumferentially disposed about the outer cylindrical surface 206 and may be further disposed proximal the outlet surface 205 of the seat 201 such that a distance between the inlet surface 204 and an edge of the groove distal (e.g., farthest) from the outlet surface 205 may indicate the minimum required thickness T of the seat 201 that may be desired for normal operation of the compressor valve including such a seat 201. The minimum required thickness T may also be the seat thickness desired so that the edges 208 of the inlet holes 203 may be re-beveled to a predetermined outer diameter between, for example, 0.695 and 0.705 inches after reconditioning the seat 201. Accordingly, the seat 201 may be reconditioned (material from the outlet surface 205 removed) only up to the groove edge farthest from the outlet surface 205. Any additional reconditioning of the seat 201 may reduce the minimum thickness T of the seat 201 and may cause improper operation and/or failure of the compressor valve. It should also be appreciated that the inlet holes 203 may be re-beveled to other dimensions based on the corresponding compressor valve specifications.

Figure 3A:
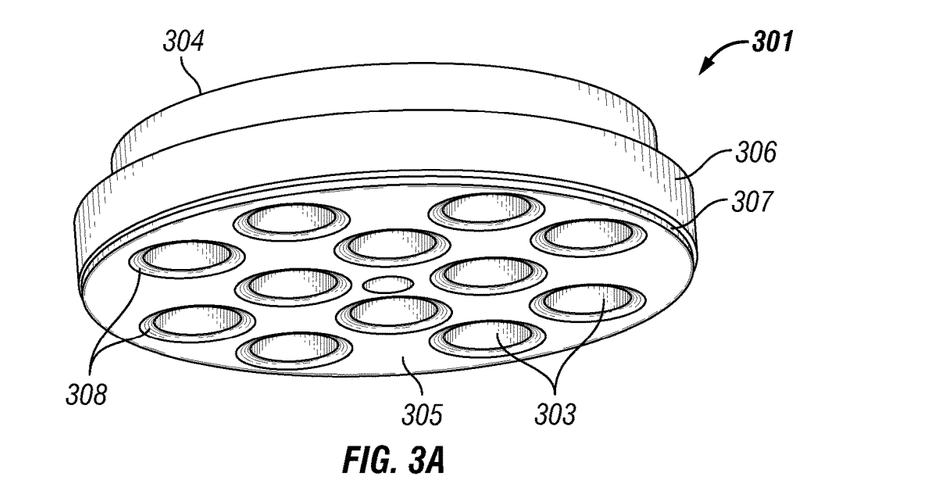
FIG. 3A illustrates a perspective view of a seat having a reconditioning limit indicator, according to another example embodiment of the disclosure.
Figure 3B:
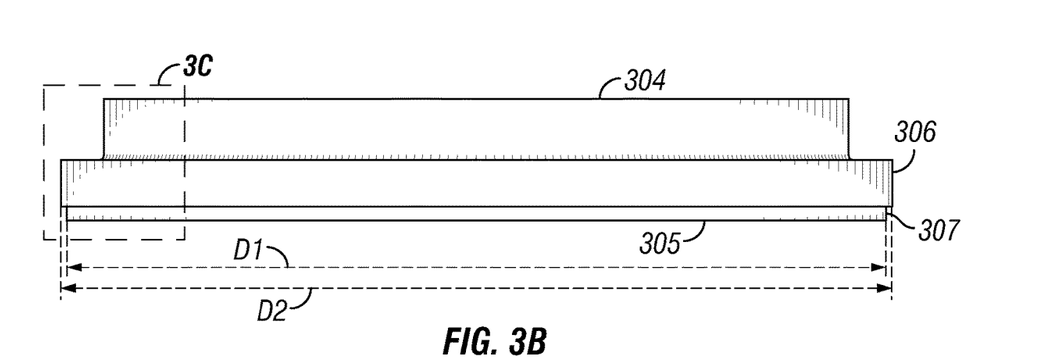
FIG. 3B illustrates a side view of the seat of FIG. 3A.
Figure 3C:
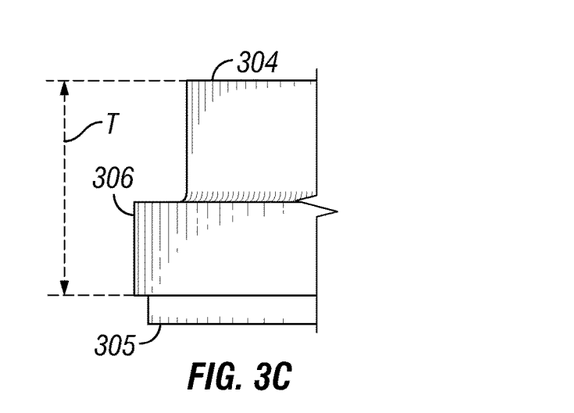
FIG. 3C illustrates an enlarged view of a portion of the seat in FIG. 3B enclosed by the dashed lines.

FIG. 3A illustrates a perspective view of a seat 301 having a reconditioning limit indicator 307, according to another example embodiment of the disclosure. FIG. 3B illustrates a side view of the seat 301 of FIG. 3A. FIG. 3C illustrates an enlarged view of a portion of the seat 301 in FIG. 3B enclosed by the dashed lines. As illustrated in FIG. 3A, material on the outer cylindrical surface 306 of the seat 301 adjacent (e.g., proximal) the outlet surface 305 may be removed to define the reconditioning limit indicator 307 having an outer diameter D1 smaller than the outer diameter D2 of the seat 301. An axial extent of the reconditioning limit indicator 307 between the outlet surface 305 and the inlet surface 304 may indicate the maximum amount of material that may be removed from the outlet surface 305 when reconditioning the seat 301. Stated otherwise, an axial extent from the inlet surface 304 of the seat 301 to the edge of the reconditioning limit indicator 307 farthest from the outlet surface 305 may indicate the minimum seat thickness T that may be desired for normal operation of the compressor valve including such a seat 301. Accordingly, reconditioning of the seat beyond the reconditioning limit indicator 307 may result in a decrease in the minimum required thickness T and may result in improper operation and/or failure of the compressor valve including the seat. As mentioned above, the minimum required thickness T may also be the seat thickness desired so that the edges 308 of the inlet holes 303 may be re-beveled to a predetermined outer diameter between, for example, 0.695 and 0.705 inches after reconditioning the seat 301. However, it should be appreciated that the inlet holes 303 may be re-beveled to other dimensions based on the corresponding compressor valve specifications.

Figure 4A:
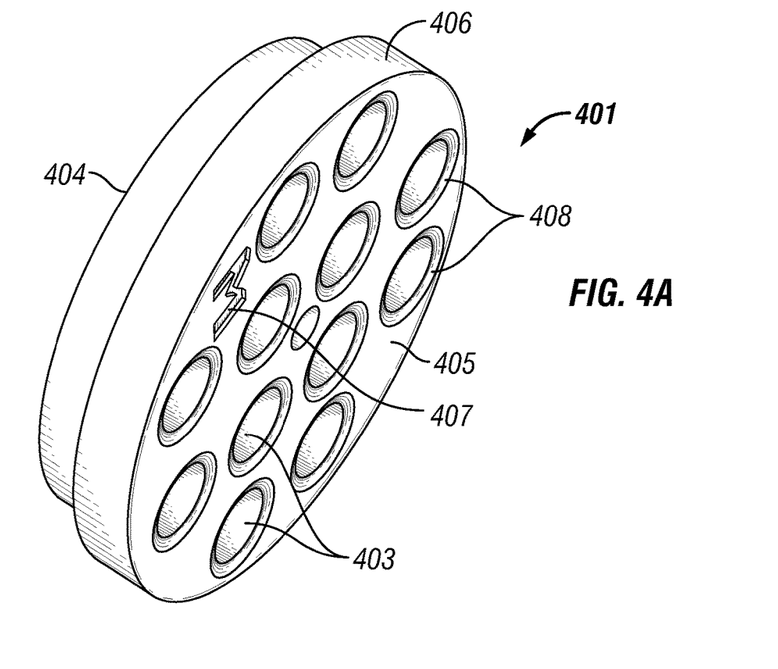
FIG. 4A illustrates a perspective view of a seat having a reconditioning limit indicator, according to yet another example embodiment of the disclosure.
Figure 4B:
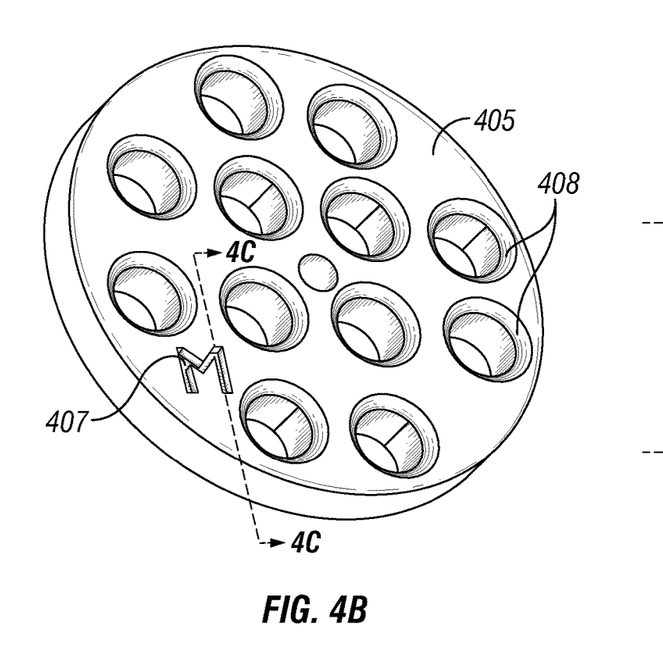
FIG. 4B illustrates another perspective view of the seat in FIG. 4A illustrating an exemplary location of the reconditioning limit indicator on the outlet surface of the seat.
Figure 4C:
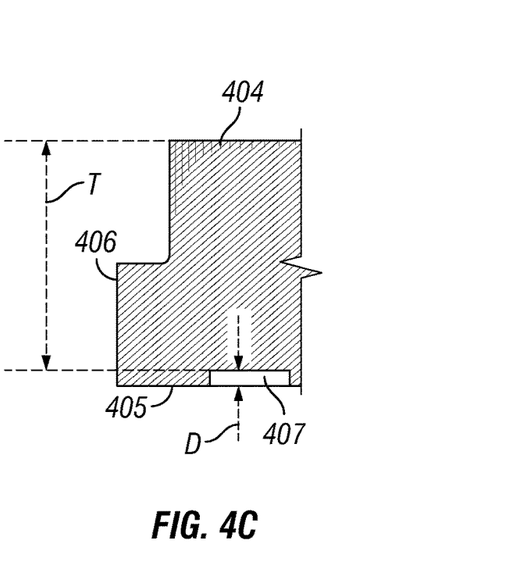
FIG. 4C illustrates a cross-sectional view of the seat in FIG. 4B taken along the line 4C-4C in FIG. 4B.

FIG. 4A illustrates a perspective view of a seat 401 having a reconditioning limit indicator 407, according to yet another example embodiment of the disclosure. FIG. 4B illustrates another perspective view of the seat 401 of FIG. 4A illustrating an exemplary location of the reconditioning limit indicator 407 on the outlet surface 405 of the seat 401. FIG. 4C illustrates a cross-sectional view of the seat 401 in FIG. 4B taken along the line 4C-4C in FIG. 4B. As illustrated, the reconditioning limit indicator 407 may have a predetermined shape (illustrated as the letter 'M' in FIGS. 4A and 4B) and a predetermined depth D (FIG. 4C), and may be machined on the outlet surface 405. The depth D of the reconditioning limit indicator 407 may be such that an axial extent of the seat 401 between the inlet surface 404 and the bottom of the reconditioning limit indicator 407 may indicate the minimum required thickness T of the seat 401 that may be desired for normal operation of the compressor valve including such a seat 401. Accordingly, the seat 401 may be reconditioned (material from the outlet surface 405 removed) only to the depth D of the reconditioning limit indicator 407. Removing any material beyond the depth D may decrease the minimum seat thickness T and may cause improper operation and/or failure of the compressor valve including the seat 401. As mentioned above, the minimum required thickness T may also be the seat thickness desired so that the edges 408 of the inlet holes 403 may be re-beveled to a predetermined outer diameter between, for example, 0.695 and 0.705 inches after reconditioning the seat 401. However, it should be appreciated that the inlet holes 403 may be re-beveled to other dimensions based on the corresponding compressor valve specifications.

Figure 5:
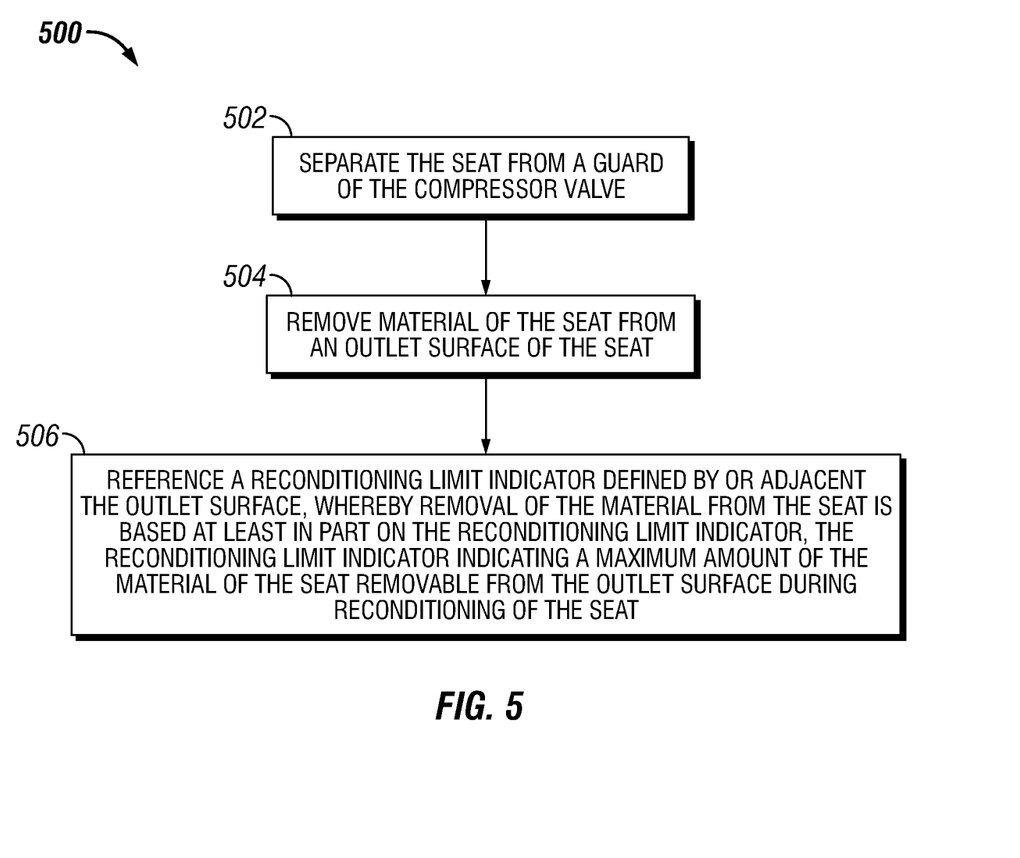
FIG. 5 is flowchart of a method of reconditioning a seat of a compressor valve, according to an example embodiment of the disclosure.

FIG. 5 is flowchart of a method 500 of reconditioning a seat of a compressor valve, according to an example embodiment of the disclosure. The method 500 may include separating the seat from a guard of the compressor valve, as shown at 502, removing material of the seat from an outlet surface of the seat, as shown at 504, and referencing a reconditioning limit indicator defined by or adjacent the outlet surface, whereby removal of the material from the seat is based at least in part on the reconditioning limit indicator, as shown at 506. The reconditioning limit indicator may indicate a maximum amount of the material of the seat that may be removed from the outlet surface during reconditioning of the seat.

Seats including the reconditioning limit indicator according to example embodiments disclosed above may allow for individuals to recondition the seat without reference to an external document or device. As a result, time spent in locating and referring to the documentation to determine the minimum seat thickness prior to reconditioning the seat may be minimized. Secondly, the seat may be reconditioned by individuals without access to the documentation or device. Since the reconditioning limit indicator may be provided on the seat itself, individual without access to the documentation or device or without knowledge of the minimum seat thickness may be able to recondition the seat. This may result in cost and time savings since the reconditioning job may be outsourced to third-party machining shops.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

We claim:

1. A method of reconditioning a seat of a compressor valve, the method comprising:
   separating the seat from a guard of the compressor valve;
   removing material of the seat from an outlet surface of the seat;
   referencing a V-shaped groove defined by an outer cylindrical surface of the seat and having a first sloped surface that forms a first edge proximal to the outlet surface and a second sloped surface that forms a second edge distal from the outlet surface, wherein the first and second sloped surfaces are separated by a gap and both the first and second edges are located on the outer cylindrical surface, whereby removal of the material from the seat is based at least in part on the v-shaped groove, a distance between the outlet surface of the seat and the second edge of the v-shaped groove indicating a maximum axial extent of the seat removable from the outlet surface during reconditioning of the seat;

reconditioning the seat such that at least the second edge of the v-shaped groove is visible, wherein the reconditioning comprises resurfacing the outlet surface of the seat, wherein the seat defines a plurality of through holes having respective annular cross-sections extending between the inlet surface and the outlet surface of the seat, the plurality of through holes fluidly coupled to respective exit openings arranged at the outlet surface, the respective exit openings being defined at least in part by respective edges that are beveled and configured to contactively receive respective valve elements to seal passage of working fluid through the exit openings when the compressor valve is in a closed condition; and re-beveling the respective edges of the exit openings such that an outer diameter of one or more of the respective exit openings is between 1.765 and 1.791 centimeters.

* * * * *